United States Patent
Ur

(10) Patent No.: US 8,386,851 B2
(45) Date of Patent: Feb. 26, 2013

(54) FUNCTIONAL COVERAGE USING COMBINATORIAL TEST DESIGN

(75) Inventor: Shmuel Ur, Shorashim (IL)

(73) Assignee: International Business Machines Corporation, Armonk, NY (US)

( * ) Notice: Subject to any disclaimer, the term of this patent is extended or adjusted under 35 U.S.C. 154(b) by 220 days.

(21) Appl. No.: 12/427,773

(22) Filed: Apr. 22, 2009

(65) Prior Publication Data

US 2010/0275062 A1 Oct. 28, 2010

(51) Int. Cl.
*G06F 11/00* (2006.01)
(52) U.S. Cl. .............................. 714/32; 714/25; 714/1
(58) Field of Classification Search ............ 714/38, 714/32, 2, 25
See application file for complete search history.

(56) References Cited

U.S. PATENT DOCUMENTS

| | | | |
|---|---|---|---|
| 6,530,054 B2 | 3/2003 | Hollander | |
| 6,577,982 B1 | 6/2003 | Erb | |
| 6,647,513 B1 * | 11/2003 | Hekmatpour | 714/37 |
| 6,742,166 B2 | 5/2004 | Foster et al. | |
| 6,928,393 B2 * | 8/2005 | Czerwonka | 702/186 |
| 7,389,215 B2 | 6/2008 | Azatchi et al. | |
| 2005/0166094 A1 * | 7/2005 | Blackwell et al. | 714/38 |
| 2007/0006041 A1 * | 1/2007 | Brunswig et al. | 714/38 |
| 2007/0168727 A1 * | 7/2007 | Fournier et al. | 714/25 |
| 2008/0172580 A1 * | 7/2008 | Davia et al. | 714/38 |

\* cited by examiner

*Primary Examiner* — Scott Baderman
*Assistant Examiner* — Sarai Butler
(74) *Attorney, Agent, or Firm* — Ziv Glazberg; Glazberg, Appelbaum & Co.

(57) ABSTRACT

A generator generates tests to improve functional coverage. A functional coverage of a first set of tests is examined in respect to a functional coverage model. The functional coverage model is transformed to a combinatorial model. The coverage measurements are used to refine the combinatorial model. The combinatorial model is utilized to generate a second set of tests that have a different functional coverage than the first set of tests. The second set of tests is utilized to examine quality of a tested system.

19 Claims, 4 Drawing Sheets

FUNCTIONAL COVERAGE USING COMBINATORIAL TEST DESIGN

BACKGROUND

The present disclosure relates to testing coverage in general, and to increasing functional coverage of a testing phase, in particular.

Computerized devices control almost every aspect of our life—from writing documents to controlling traffic lights. However, computerized devices are bug-prone, and thus require a testing phase in which the bugs should be discovered. The testing phase is considered one of the most difficult tasks in designing a computerized device. The cost of a bug may be enormous, as its consequences may be disastrous. For example, a bug may cause the injury of a person relying on the designated behavior of the computerized device. Additionally, a bug in hardware or firmware may be expensive to fix, as patching it requires call-back of the computerized device. Hence, many developers of computerized devices invest a large portion, such as 70%, of the development cycle to discover erroneous behaviors of the computerized device.

During the testing phase, a sample of all possible behaviors of the computerized device is inspected. Modern testing techniques focus on testing different behaviors, by measuring coverage of the executed tests. Functional coverage is one such method. It is designed to measure amount, portion or a similar metric of tests that examined predetermined functional behaviors. Once functional coverage is measured, quality assurance (QA) personnel may design additional tests to examine untested behaviors.

Another testing technique is combinatorial test design, in which a model of possible behaviors of the computerized device is formulated and is used to generate tests that are configured to cover a subset of all possible behaviors. For example, a model may define possible configurations of a system comprising an operating system (OS), a web-browser, a mail server and a central processing unit (CPU). The OS may be, for example, Linux, Microsoft Windows XP or Microsoft Windows Vista. The web-browser may be, for example, Mozilla Firefox, Google Chrome, Microsoft Internet Explorer or Opera web browser. In a similar manner, there may be a predetermined number of mail servers and CPUs. A test of each possible combination of the above mentioned components may be created, however, in order to reduce the number of tests to be executed, a combinatorial test design may be applied. A model may define or characterize subsets of the entire test-space to cover. The model may additionally define a subset of the entire test-space that is invalid. For example, a known incompatibility between Linux OS with the Microsoft Internet Explorer web browser. Thus enabling generation of tests that are configured to cover a subset of all possible behaviors of the system. The model may be defined to cover a small subset of all possible behaviors, such that the small subset has predetermined properties that are deemed favorable by, for example, QA personnel.

BRIEF SUMMARY OF THE INVENTION

One exemplary embodiment of the disclosed subject matter is a computerized system comprising: a functional coverage analyzer for analyzing a functional coverage of an at least one executed test; and a combinatorial test generator for generating at least one additional test; the at least one additional test is designed to cover a functional aspect not covered in the functional coverage; the combinatorial test generator comprises a processor for generating and a computer-readable media for storing the at least one additional test.

Another exemplary embodiment of the disclosed subject matter is a method comprising: measuring a functional coverage of an at least one executed test using a functional coverage model; defining a combinatorial model associated to the functional coverage model; the combinatorial model defines a first set of one or more tests; modifying the combinatorial model in accordance to the functional coverage; the modifying the combinatorial model is performed by a processor; and storing the modified combinatorial model in a computer-readable media, whereby the combinatorial model is transformed to a modified combinatorial model defining a second set of one or more tests; the second set of one or more tests is different than the first set of one or more tests.

Yet another exemplary embodiment of the disclosed subject matter is a computer program product comprising: a computer readable medium; first program instructions to measure a functional coverage of an at least one executed test using a functional coverage model; second program instructions to define a combinatorial model associated to the functional coverage model; the combinatorial model defines a first set of one or more tests; third program instructions to modify the combinatorial model in accordance to the functional coverage; fourth program instructions to store the modified combinatorial model in a computer-readable media; wherein the first, second, third and fourth program instructions are stored on the computer readable media.

Yet another exemplary embodiment of the disclosed subject matter is a computerized system comprising: a functional coverage analyzer for analyzing a functional coverage of an at least one executed test; the functional coverage analyzer further comprising: a coverage model module for defining a functional coverage model and for evaluating a functional coverage of the at least one executed test; a testing tracker for tracking the at least one executed test; a reporting module for generating a report of the functional coverage; a first I/O device; and a first processor configured to be utilized by the testing tracker; a combinatorial test generator for generating at least one additional test; the at least one additional test is designed to cover a functional aspect not covered in the functional coverage; the combinatorial tests generator comprising: a combinatorial model module for defining a combinatorial model; the combinatorial model module comprising: an at least one redundant test; an at least one restriction; an at least one definition; a test generator for generating the at least one additional test; a second I/O device; and a second processor configured to be utilized by the test generator; and a model adapter for adapting the functional model to the combinatorial model.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to enhance the functional coverage of a testing phase. Another technical problem dealt with by the disclosed subject matter is to enable the reuse of a coverage model used in by a functional coverage module in a combinatorial test generator.

One technical solution is to provide a combinatorial test generator to create tests that were not covered by the first set of tests. The coverage of the first set of tests is measured by a functional coverage analyzer. According to the functional coverage measured by the functional coverage analyzer a combinatorial model is created and/or modified to generate tests the cover functionality not covered by the first set of tests. Another technical solution is to use a model adapter to translate a coverage model into a combinatorial test generator.

One technical effect of utilizing the disclosed subject matter is generating a set of tests having different functional coverage than an original set of tests. Another technical effect is converting a functional coverage model used to measure functional coverage into a combinatorial model used to generate new tests.

Figure 1:
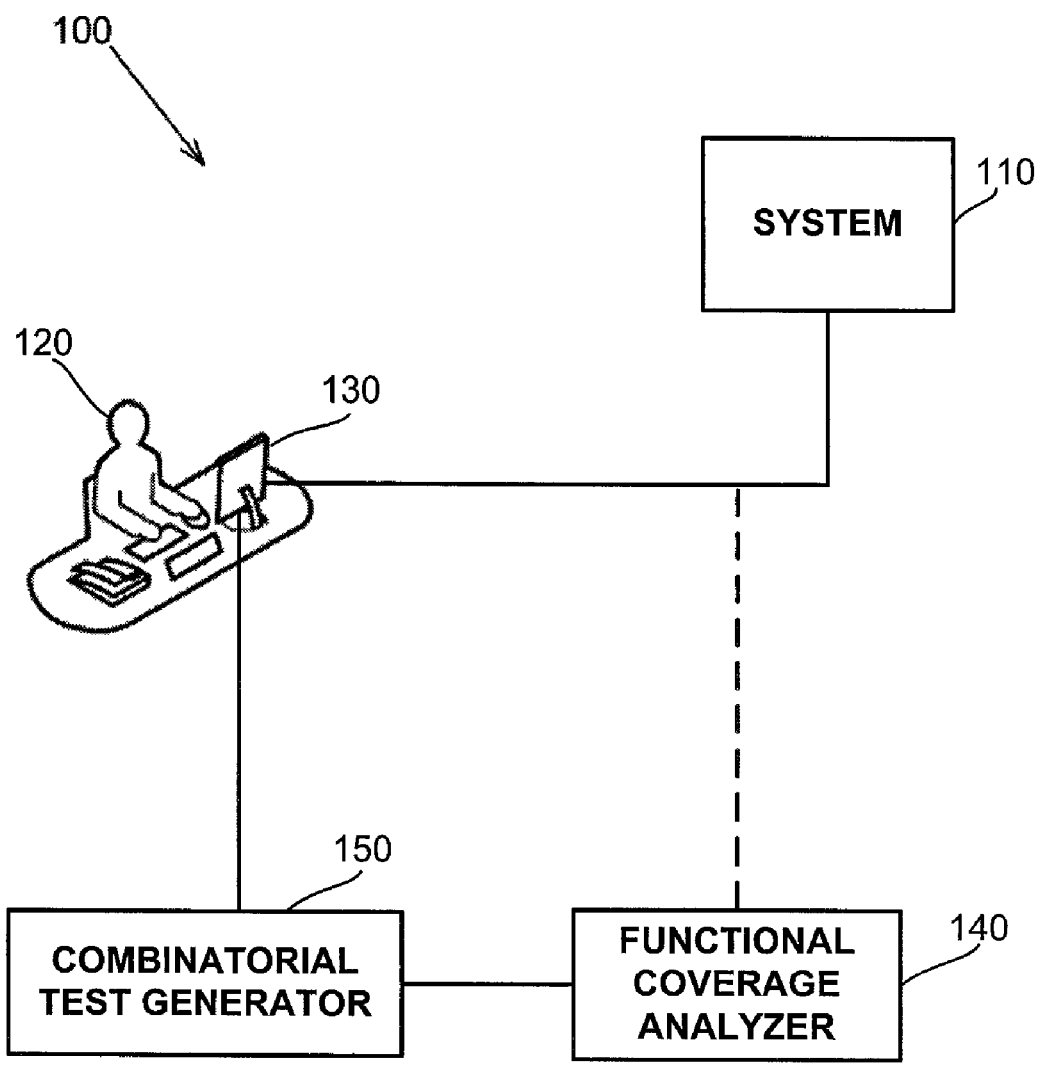
FIG. 1 shows a typical computerized environment in which the disclosed subject matter is used, in accordance with some exemplary embodiments of the subject matter.

Referring now to FIG. 1 showing a typical computerized environment in which the disclosed subject matter is used, in accordance with some exemplary embodiments of the subject matter. A computerized environment 100 comprises a system 110, a functional coverage analyzer 140, a combinatorial test generator 150, a computerized client 130 and a user 120. The system 110 is being tested, for example, by executing a predetermined set of one or more tests, also referred to as original set of tests. In some exemplary embodiments, the system 110 is being tested using a benchmark testing suite. The user 120 may be a QA personnel, a developer or the like. The user 120 may be responsible for testing the system 110. In some exemplary embodiments, the user 120 executes the tests automatically or manually using the computerized client 130. In other exemplary embodiment, a third party executes the tests and the user 120 utilizes the computerized client 130 to inspect results of the tests. The result may refer to correctness, performance or any other measurement parameter. In other exemplary embodiments, the user 120 may design specific tests to examine the correctness or performance of the system 110.

In some exemplary embodiments, the user 120 may utilize the functional coverage analyzer 140 to determine functional coverage of the tests executed in respect to the system 110. The user 120 may further design additional tests to be executed such that they will cover functional coverage parameters not covered by the original set of tests.

In some exemplary embodiments of the disclosed subject matter, the combinatorial test generator 150 may receive from the functional coverage analyzer 140 data relating to the functional coverage. The combinatorial test generator 150 may further inspect the data relating to the functional coverage in order to generate additional tests. The additional tests may be designed to cover functional parameters not covered by the original set of tests.

In some exemplary embodiments of the disclosed subject matter, the computerized client 130 receives the additional tests from the combinatorial test generator 150. In other exemplary embodiments, the additional tests are sent directly to a benchmarking module (not shown). The additional tests may be abstract tests which require to be completed to concrete tests by the user 120 or another person. The additional tests may be completed automatically to a concrete test. An abstract test is a test which defines a strict subset of all parameters required to be defined in order to run a test on the system 110. For example, an abstract test may comprise a list of events to be triggers. The concrete test is a test which defines all parameters required to be defined. Hence, the concrete test in the aforementioned example, further defines behaviors that induce triggering the events defined by the abstract test.

In some additional exemplary embodiments of the disclosed subject matter, the additional tests may be executed and the functional coverage analyzer 140 may verify that they have reached a functional coverage they were designed to reach. In other exemplary embodiments, the combinatorial test generator 150 may further be utilized to reach an improved functional coverage. Improved functional coverage may be reached, for example, by testing an abstract scenario, such as having event A occur before event B, in several tests. Improved functional coverage may be further reached by refactoring functional coverage parameters. For example, in a database system, an event may be an update event and a fetch event. Refactoring the parameters may introduce specific types of update events such as insertion of a new data record, an update of an existing data record and the like.

Figure 2:
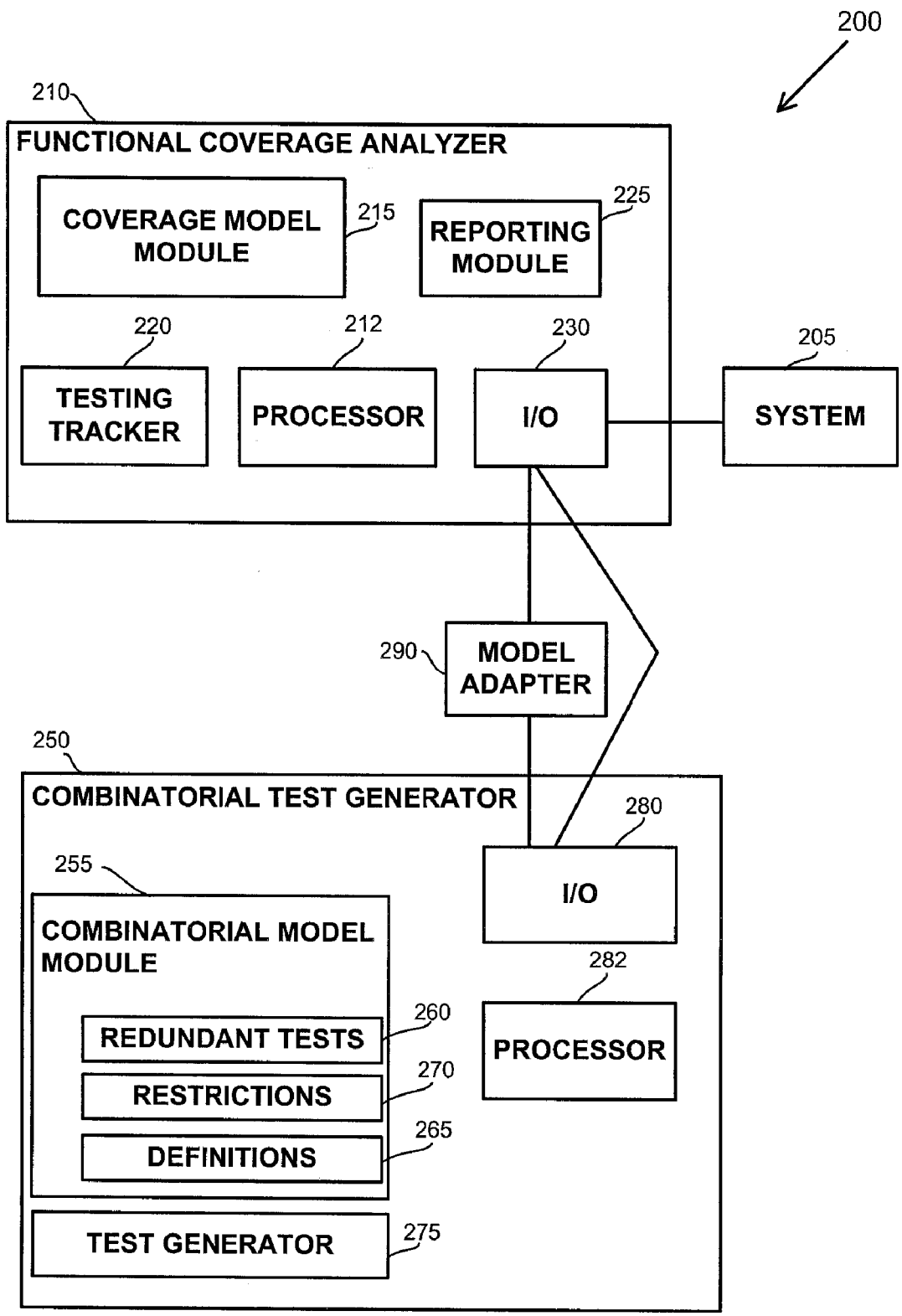
FIG. 2 shows a block diagram of a computerized system in accordance with some exemplary embodiments of the disclosed subject matter.

Referring now to FIG. 2 showing a block diagram of a computerized system in accordance with some exemplary embodiments of the disclosed subject matter. A computerized apparatus 200 comprises a functional coverage analyzer 210, a combinatorial test generator 250 and a system 205. The system 205 is a system being tested, such as 110 of FIG. 1.

The functional coverage analyzer 210, such as 140 of FIG. 1, is a computerized apparatus for determining functional coverage of an original set of tests being executed on the system 205. In an exemplary embodiment of the disclosed subject matter, the functional coverage analyzer 210 comprises a coverage model module 215, a testing tracker 220, and an I/O device 230.

The testing tracker 220 may track execution of a test on the system 205 in order to measure functional coverage. The testing tracker may track the execution on-the-fly, such as by snipping information sent by and to the system 205, by utilizing a predetermined interface such as an API enabling tracking, by determining a state of the system 205 and detecting changes to that state and the like. The testing tracker 220 may utilize the I/O device 230 in order to enable tracking system 205 as aforementioned disclosed.

In some exemplary embodiments, the functional coverage analyzer 210 further comprises a reporting module 225 that generates a functional coverage report based on the tracking performed by the testing tracker 220. The reporting module 225 may store the report in a storage device such as a hard disk, a CD or the like. The reporting module 225 may display a report, or otherwise relay its content to a user, such as user 120 of FIG. 1. The reporting module may utilize the I/O device 230 in relaying the report to a user, storing the report or transmitting it as is disclosed below.

In some exemplary embodiments, the functional coverage analyzer 210 further comprises a processor 212. The processor 212 is a Central Processing Unit (CPU), a microprocessor, an electronic circuit, an Integrated Circuit (IC) or the like. The processor 212 may be utilized to perform computations required by the coverage model module 215 and/or the testing tracker 220 and/or the reporting module 225.

The coverage model module 215 is configured to define the functional coverage model to be used when measuring coverage of the original set of tests. The coverage model may be defined by a user, such as user 120 of FIG. 1, and passed to the coverage model module 215 using the I/O device 230.

The coverage model may define coverage measurements of an execution of the system 205. In some exemplary embodiments, the coverage measurement refers to a predetermined set of possible configurations of hardware, software or other components of the system 205. In other exemplary embodiments, the coverage measurement refers to occurrence of events, such as transactions, synchronization events, procedural events of the system 205 and the like. In yet other exemplary embodiments, the coverage measurement refers to timing or ordering of events; to an output or input of the system 205; to an internal state of the system 205 such as values of variables; to an to utilization of resources of the system 205 such as a storage device or an IPC resource, and the like. A non-limiting example of a functional coverage defines two synchronization events: reading a value of a global variable and updating a value of the global variable. Each synchronization event may be performed by any one of processes or threads of the system 205. The exemplary functional coverage model is designed to increase testing quality by testing different ordering of the synchronization events.

In some exemplary embodiments, the coverage model may be a snapshot model which measures the state of the system 205, a temporal model which deals with scenarios and the like. Some exemplary functional models may measure several properties in parallel. Additionally, functional coverage models may be based on is specifications of the system 205 (referred to as BlackBox) or be derived from its implementation (referred to as WhiteBox) or the combination thereof. It will be noted that the functional coverage model may be defined such that any measureable aspect of the function of the system 205 may be used. The functional coverage model may define possible combinations of such measurable aspects, ordering between them and the like.

The combinatorial test generator 250 comprises an I/O device 280 enabling receiving input from the I/O device 230 of the functional coverage analyzer 210 and other components. The I/O device 280 further enables the storage of generated tests that the combinatorial test generator 250 creates. The combinatorial test generator 250 further comprises a combinatorial model module 255 and a test generator 275.

In some exemplary embodiments, the combinatorial test generator 250 further comprises a processor 282. The processor 282 is a CPU, a microprocessor, an electronic circuit, an IC or the like. The processor 282 may be utilized to perform computations required by the combinatorial model module 255 and/or the test generator 275. In some exemplary embodiments, the processor 282 is the processor 212.

The combinatorial model module 255 defines the combinatorial model that may be utilized by the test generator 275 in generating tests. The combinatorial model module 225 defines a combinatorial model describing a set of characteristics, parameters and/or rules which define a subset of all possible tests for the system 205. In an exemplary non-limiting system 205, there are four components—a web browser, an operating system (OS), a storage device and a communication device. For each component, there are several possible implementations. As an example, the web browser may be a Microsoft Internet Explorer or a Mozilla Firefox. The combinatorial model module 225 comprises definitions 265, restrictions 270 and/or redundant tests 260. It will be noted that the definitions 265 may comprise a single definition. In a similar manner, restrictions 270 and redundant tests 260 may also be singular.

Definitions 265 may describe each implementation of each component. Hence, a subset of all possible combination is described. However, the total number of tests required by such definition is exponential to the number of components and is significantly increased even by the addition of an implementation of a component. An additional definition in definitions 265 may be provided such that it determines that not all possible combinations are required to be tested. Testing each implementation of any two components is the preferred technique as under usual circumstances a bug relating to an incompatibility of components requires only two components. In some other cases, testing each three components is desirable. By providing a definition to definitions 265 that require testing of not all possible combinations of components, but rather all possible combinations of two components, the combinatorial model defines a much smaller subspace of all possible tests. It will be further noted that the above provided example, was an exemplary definitions 265 and any other characteristics, parameters or rules may be utilized to describe a subset of tests of the system 205. Combinatorial calculations may be utilized to determine a set of tests that comply with the definitions 265. Other methods of determining a set of tests that comply with the definitions 265, such as brute force enumeration, theorem proving, constraint satisfaction problem and the like, may be utilized.

Referring to the aforementioned non-limiting example, the definitions 265 provide that there are three possible web browsers for the system 205. The definitions 265 may further provide, for example, that there are ten possible operating systems, ten possible storage devices and four possible communication devices. A simple Cartesian product of all possible combinations comprises 1200 tests. In case the definitions 265 further provide that a combination of every three components should be tested, a reduction of about 50% in the number of tests is possible, and 646 tests are sufficient. In case the definitions 265 provide instead that a combination of every two components is should be tests, a reduction of about 86% in the number of tests is possible, and 162 tests are sufficient.

Restrictions 270 may be defined when a possible subset of tests should not be evaluated. For example, referring again to the component example of the previous section, a Microsoft Internet Explorer web browser should not be tested when a Linux operating system is used, as the two components are not compatible. In order to avoid generating such tests that will not improve QA, the restriction 270 stating that the two components are incompatible may be added. It will be noted that adding a restriction may not always reduce the number of tests. In some situations adding a restriction may actually increase the number of tests.

Referring again to the non-limiting example above, a single test comprises four implementations, one of each component. If the definitions 265 provide that each pair of components should be evaluated, a single test provides 6 couples (OS-web browser, OS-storage device, OS-communication device, web-browser-storage device, web browser-communication device, storage device-communication device). Hence, if a specific couple is illegal, removing a test comprising that couple, may require an addition of two or more other tests testing a portion of the other five couples that the original test provided.

The redundant tests 260 may define tests that are not illegal on the one hand, but are not required to be tested on the other. It will be noted that a redundant test cannot increase the number of tests, unlike a restriction.

The test generator 275 generates a set of one or more tests in accordance with the combinatorial model defined in the combinatorial model module 225. As described above, the test generator 275 may generate the tests by utilizing a combinatorial mathematical algorithm, a brute force enumeration and the like. The test generator 275 may generate abstract tests or concrete tests in accordance with the information available to it. For example, if all information required in order to create a concrete test is available to the test generator 275 it may generate a concrete test. In some exemplary embodiments, the test generator 275 creates an abstract test and an additional module complements the abstract test to a concrete test. The additional module may have access to information required to complement the abstract test, or may enable a user to provide that information or to complement the abstract test manually. The test generator 275 may transmit, send or otherwise pass to a user, such as 120 of FIG. 1, the generated tests using the I/O device 280. The user, a benchmarking module or the like may execute the generated tests on the system 205.

In some exemplary embodiments of the disclosed subject matter, the computerized apparatus 200 further comprises a model adapter 290. The model adapter 290 is configured to adapt a functional coverage model, such as defined by the coverage model module 215, to a combinatorial model, such as defined by the combinatorial model module 225. The model adapter utilizes I/O devices 230 and 280 to receive the functional coverage model and to send the combinatorial model, respectfully. It will be appreciated that in some exemplary embodiments the model adapter 290 may be comprised within the functional coverage analyzer 210, the combinatorial test generator 250 or within another device or module. In such cases, the model adapter 290 may be connected to other devices enabling the model adapter 290 to receive a functional coverage model and transmit the combinatorial model to the combinatorial model module 225.

In some exemplary embodiments, the model adapter 290 further comprises a processor (not shown) utilized for transforming the function coverage model to the combinatorial model.

In order to exemplify an adaptation process performed by the model adapter 290, consider another non-limiting example in which the coverage model defines a list of up to five consecutive transactions. The coverage model further defines all possible transactions, such as fetch a data record, update a data record, insert a data record, delete a data record and the like. The coverage model yet further defines that it is sufficient to examine each transaction when occurring in between every possible other transaction. A vector of transactions ($t\_1, t\_2, t\_3, t\_4, t\_5$) defines each test, where $t\_1, t\_2, t\_3, t\_4, t\_5$ are each either a transaction or a null transaction. If $t\_i$ is a null transaction then for every $j>i$ $t\_j$ is also a null transaction. The coverage model defines that it is sufficient to examine a transaction t in respect to every any transactions v and u, such that exists an $1 \leq i \leq 5$ for which $t\_i-1=v$, $t\_i=t$ and $t\_i+1=u$.

The model adapter 290 may define a combinatorial model based on the functional coverage model. The definitions 265 of the combinatorial model define the list of up to five consecutive transactions, as defined in the combinatorial model. The definitions 265 further define all possible transactions and that it is sufficient to examine every triple of transactions. The model adapter may further utilize the reporting module 225 to add tests to the redundant tests 260. Each scenario covered by a test that was already executed on the system 205 and tracked by the testing tracker 220 may be considered a redundant test. For example, if a test detailed by a vector (a,b,c,d,e) has been executed. The following scenarios are redundant tests 260: (a,b,c), (b,c,d), (c,d,e). The model adapter 290 may utilize the reporting module 225 to determine which scenarios were tested on the system 205. In some exemplary embodiments, the model adapter 290 may define the restrictions 270 of the combinatorial model in respect to manual decisions of a user, a database comprising known compatibility issues and the like.

Figure 3:
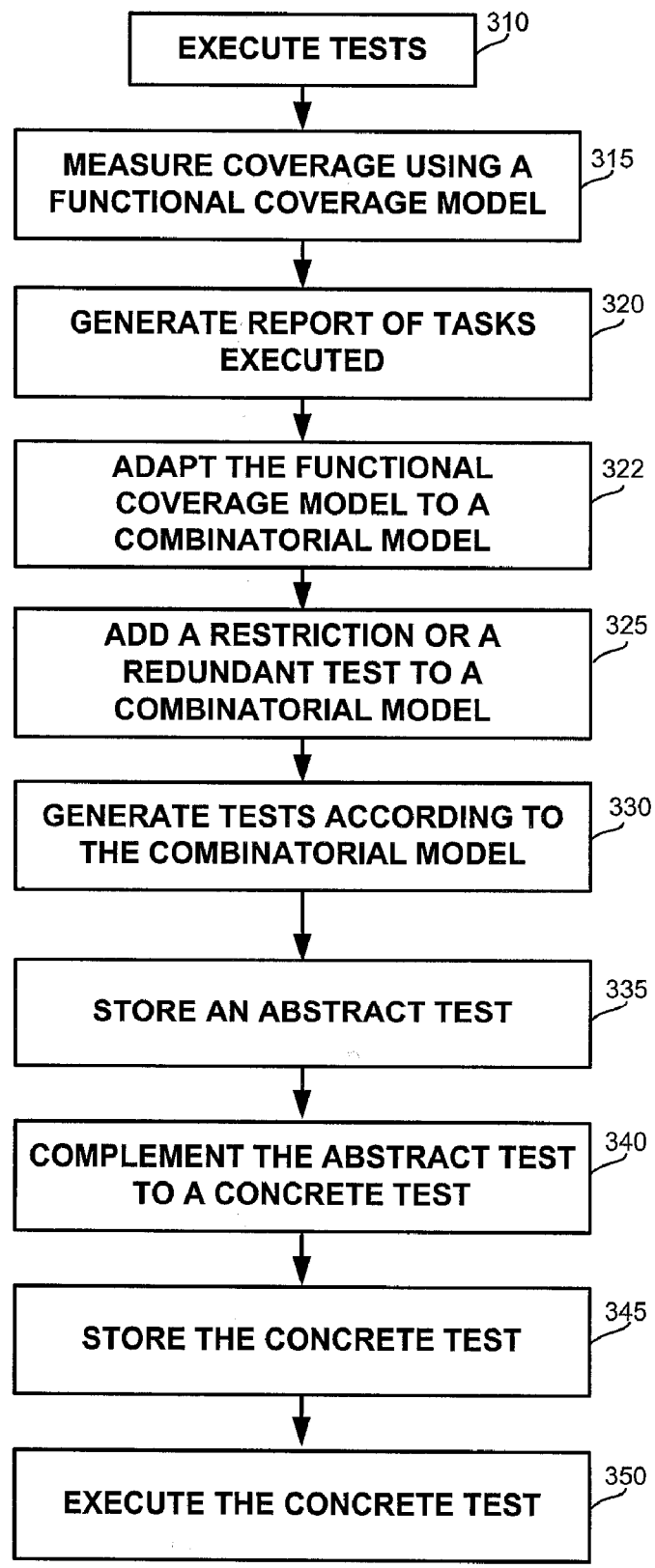
FIG. 3 shows a flowchart diagram of a method in accordance with some exemplary embodiments of the disclosed subject matter.

Referring now to FIG. 3 showing a flowchart diagram of a method in accordance with some exemplary embodiments of the disclosed subject matter. In step 310 several tests are being executed on a system, such as 110 of FIG. 1. The tests may be executed manually, semi-automatically or automatically. The tests may be designed by a developer, a tester or the like specifically to be executed by the system. The tests may be designed for a type of systems that the system relates to. The tests may be benchmark tests, tests executed on a previous version of the system and the like.

In step 315, a functional coverage analyzer, such as 140 of FIG. 1, is utilized to examine the executed tests in respect to a predetermined coverage model. It will be noted that the functional coverage analyzer may measure coverage of the executed tests after they have been executed, during their execution or a combination of the above.

In step 320, a report of executed tasks is generated, by, for example, a reporting module such as 225 of FIG. 2. The report may comprise a list of executed tasks, a list of tasks that were not executed and the like. In some exemplary embodiments, it is desired to inspect each task a predetermined number of times. The report may indicate a number of times a task was executed by a test. For example, a task of executing transaction A, followed by transaction B followed by transaction A may be performed twice by the following test (A,B,A,B,A), or it may be performed twice by two separate tests such as (A,B,A,C,C) and (C,B,A,B,A).

In step 322, the functional coverage model used in step 315 is transformed to a combinatorial model. Such transformation may be performed by a model adapter such as 290 of FIG. 2.

In step 325, the report generated in step 320 is utilized to determine which scenarios or tests are redundant. According to such a determination, the combinatorial model is modified to comprise a redundant test. In some exemplary embodiments, a restriction is added to the combinatorial model instead of the redundant test. For example, if the combinatorial model does not support redundant tests, but does support restrictions, adding a restriction is the only method to provide the combinatorial model with a method to decrease the number of tests to be executed. In other exemplary embodiments, only a portion of the redundant tests are defined as restrictions. The portion is selected such that it minimizes or assures lowering the number of tests generated in step 330. For example, as described above, under some situations, adding a restriction increases the number of generated tests. In such situations, the exemplary embodiment of disclosed subject matter may determine not to add the restriction.

In step 330, the combinatorial model is utilized to generate at least one test. Step 330 may be performed by a combinatorial test generator, such as 250 of FIG. 2. In some exemplary embodiments, the generated test is an abstract test. It will be noted that on other exemplary embodiments, the generated test is a concrete test. In some embodiments, more than one test is generated.

In step 335, the abstract test that was generated in step 330, is stored in some storage device. The storage device may be a local or a remote device. It may be a RAM storage, a flash memory, a hard disk or the like.

In step 340, additional information is utilized to complement the abstract test to a concrete test. Step 340 may be performed manually, for example, if configuring specific hardware is required. Step 340 may be performed semi-automatically or fully automatically in case the information required to generate the test is available to a computerized apparatus such as a combinatorial test generator 250 of FIG. 2.

In step 345, the concrete test is stored, in a similar manner to storing performed in step 335. It will be noted that in some exemplary embodiments of the disclosed subject matter, the tests generated in step 340 are concrete and hence steps 335 and 340 are not required to be performed and may be skipped.

In step 350, the concrete test is executed on the system. In some exemplary embodiments, the concrete test may be performed automatically. In other exemplary embodiments, some manual intervention may be required. Such is the case, for example, when specific hardware is required to be physically connected or altered in order to execute the test.

Figure 4:
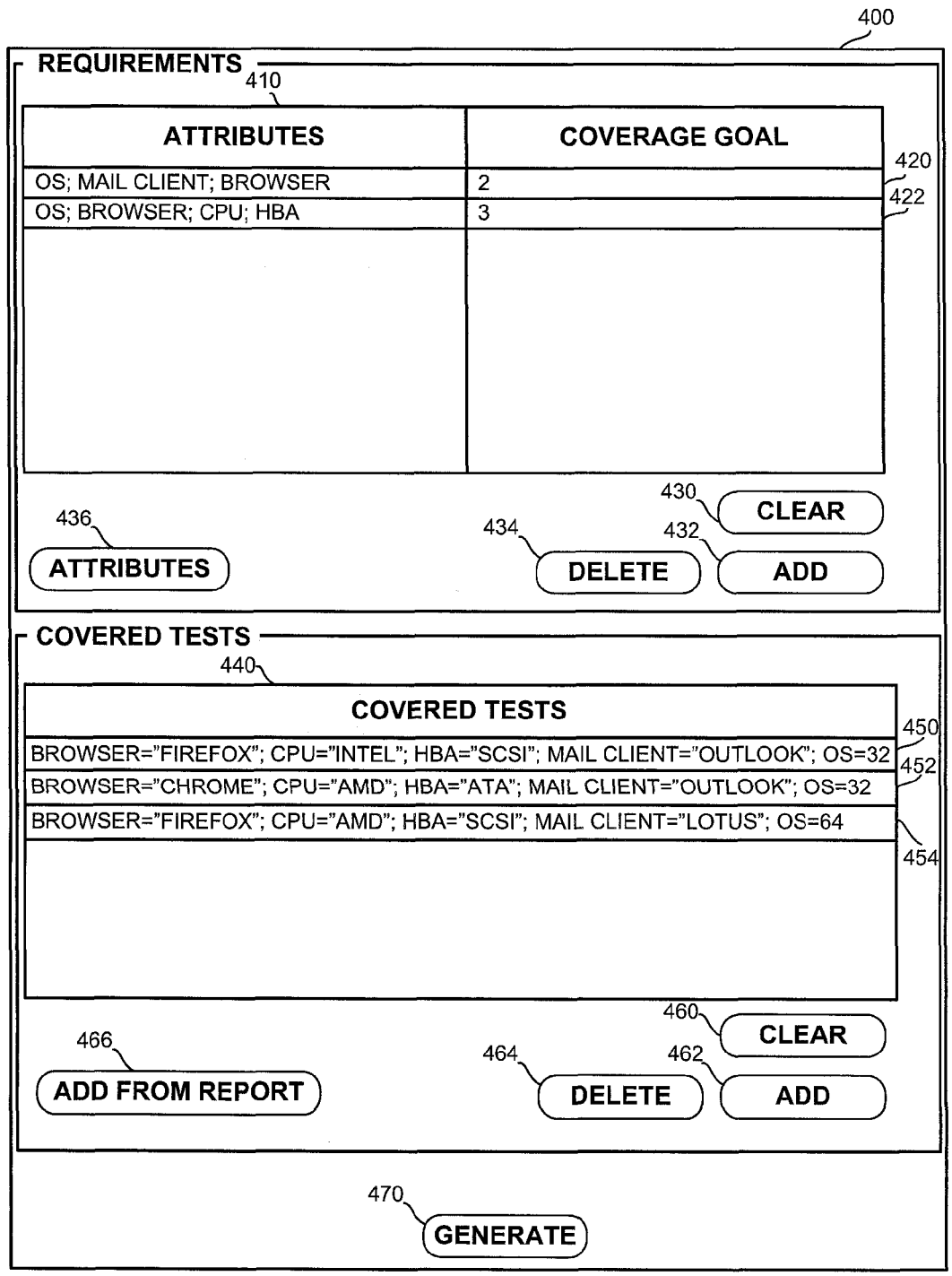
FIG. 4 shows a screenshot of a computerized environment in accordance with some exemplary embodiments of the disclosed subject matter.

Referring now to FIG. 4 showing a screenshot of a computerized environment in accordance with some exemplary embodiments of the disclosed subject matter. A screenshot 400 comprises a requirements pane 410 and a covered tests pane 440. The requirements pane 410 further comprises requirements 420 and 422. The requirement 420 provides that of the set of OS, mail client and browser, every two combinations should be tested. The requirement 422 provides that of the set of OS, browser, CPU and HBA (Host Bus Adapter) every three combinations of components should be tested. A clear button 430, when pressed, may clear the list of requirement in the requirements pane 410. A delete button 434 may enable a deletion of a specific requirement, such as the requirement 420. An add button 432 may enable an addition of a new requirement.

Pressing the add button 432 may display a secondary pane (not shown) in which a list of attributes (not shown) may be shown. A user may select some of the attributes in the list of attributes and designate a coverage goal. The coverage goal may be a predetermined number defining a subset of the selected attributes that should be tested in respect to each other. The coverage goal may define an ordering or timing between the selected attributes.

An attributes button 436 may enable a user to define additional attributes and/or define possible implementations for the attributes. For example, an OS attribute may be implemented by two operating systems—a 32 bit operating system, labeled "32", and a 64-bit operating system, labeled "64".

The covered tests pane 440 comprises covered tests 450, 452 and 454. The covered tests 450, 452, 454 define redundant tests, such as 260 of FIG. 2. Covered test 450 indicates that a test was performed for which the browser was a Mozilla Firefox, The CPU was manufactured by Intel, the HBA was SCSI, the mail client was Microsoft Outlook and the OS was a 32 bit operating system. Covered test 452 indicates that a test was performed using Google Chrome, a CPU manufactured by AMD, ATA HBA, Microsoft Outlook and a 32 bit OS. The covered test 454 indicates that a test was performed using Mozilla Firefox, a CPU manufactured by AMD, SCSI HBA, IBM Lotus and a 64 bit OS. A clear button 460 may clear the list of covered tests in the covered tests pane 440. A delete button 464 may delete a specific covered test from the covered tests pane 440. An add button 462 may enable a user to manually define tests that were covered. An add from report button 466 may enable a user to use a report, such as produced by a reporting module 225 of FIG. 2, to add covered tests in respect to the information in the report.

The screenshot 400 may further comprise a generate button 470. The generate button 470 enables generation of abstract or concrete tests in accordance with the requirements defined by the requirements pane 410 and that does not necessarily cover the covered tests in the covered tests pane 440.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computerized system comprising:
   a functional coverage analyzer for analyzing, based on a functional coverage model, a functional coverage of an at least one executed test, wherein the functional coverage model defines at least: functional attributes and associated values, whereby the functional coverage model defines a coverage test-space;
   a combinatorial test generator for generating at least one additional test based on a pair-wise or more coverage goal, wherein the pair-wise or more coverage goal defines a number of combinations of values that are to be covered, wherein the number is greater than two, wherein said combinatorial test generator is configured to generate the at least one additional test so as to achieve functional coverage of a sub-portion of the coverage test-space defined by the pair-wise or more coverage goal, wherein at least a portion of the at least one additional test is designed to cover a functional aspect not covered in the functional coverage;
   a model adapter configured to adapt the functional coverage model to a combinatorial model, wherein the model adapter is configured to define a redundant test in the combinatorial model based on covered tests of the test-space according to the functional coverage, wherein a redundant test is a scenario that if tested, does not increase the number of executed tests; and
   whereby the coverage goal is achieved by generating a test in accordance with the combinatorial model comprising the redundant test, the test covering a first pair-wise or more combination of values covered by the functional coverage and a second pair-wise or more combination of values not covered by the functional coverage, wherein the first pair-wise or more combination of values is associated with the redundant test; and
   wherein said combinatorial test generator comprises a processor for generating and a computer-readable media for storing the at least one additional test.

2. The computerized system of claim 1, wherein the functional coverage analyzer further comprising:
   a coverage model module for defining coverage aspects;
   a testing tracker to track an execution of the at least one executed test; and
   wherein the combinatorial test generator further comprising:
   a combinatorial model module; and
   a test generator.

3. The computerized system of claim 2, wherein the combinatorial model module comprises an at least one definition and an at least one redundant test.

4. The computerized system of claim 3, wherein the combinatorial model module further comprises an at least one restriction.

5. The computerized system of claim 1, wherein the at least one additional test is an abstract test.

6. The computerized system of claim 1, further comprising an input module adapted to receive from a user the number of combination of values for defining the pair-wise or more coverage goal.

7. The computerized system of claim 6, wherein said input module further adapted to receive a plurality of number for defining a plurality of pair-wise or more coverage goals, wherein each pair-wise or more coverage goal is associated with a different set of attributes selected from the functional attributes; and wherein the plurality of pair-wise or more coverage goals jointly define the sub-portion of the coverage test-space.

8. The computerized system of claim 1,
wherein having uncovered tests that are not covered by the functional coverage; and
wherein said combinatorial test generator is adapted to:
generate the at least one additional test to cover one or more uncovered tests comprising at least one pair-wise or more combination of values that is not covered by the functional coverage; and
whereby achieving coverage of the sub-portion of the coverage test-space without covering all the uncovered tests.

9. The computerized system of claim 1, wherein the number defined by the pair-wise or more coverage goal is smaller than a number of functional attributes defined by the functional coverage model, whereby the pair-wise or more coverage goal defines the sub-portion to be smaller than Cartesian product test-space defined by the functional coverage model.

10. The computerized system of claim 1, wherein the pair-wise or more coverage goal is either a pair-wise coverage goal or a three-wise coverage goal; and wherein a number of functional coverage attributes in the functional coverage model is greater than three.

11. A computer-implemented method, the method performed by a processor, the method comprising:
measuring a functional coverage of an at least one executed test using a functional coverage model, wherein the functional coverage model defines at least: functional attributes and associated values, whereby the functional coverage model defines a coverage test-space; and
generating an at least one additional test using combinatorial test design based on a pair-wise or more coverage goal so as to achieve functional coverage of a sub-portion of the coverage test-space defined by the pair-wise or more coverage goal, wherein the pair-wise or more coverage goal defines a number of combinations of values that are to be covered, wherein the number is greater than two, and
adapting the functional coverage model to a combinatorial model, wherein said adapting comprises defining a redundant test in the combinatorial model based on covered tests of the test-space according to the functional coverage, wherein a redundant test is a scenario that if tested, does not increase the number of executed tests; and whereby the coverage goal is achieved by generating a test in accordance with the combinatorial model comprising the redundant test, the test covering a first pair-wise or more combination of values covered by the functional coverage and a second pair-wise or more combination of values not covered by the functional coverage, wherein the first pair-wise or more combination of values is associated with the redundant test; wherein at least a portion of the at least one additional test is designed to cover a functional aspect not covered in the functional coverage.

12. The method of claim 11 further comprising storing the at least one additional attest in a computer-readable media.

13. The method of claim 11 wherein the at least one additional test is one or more concrete tests; the method further comprising executing a portion of the one or more concrete tests.

14. The method of claim 11 wherein the at least one additional test is one or more abstract tests; the method further comprises complementing the abstract tests to concrete tests.

15. The method of claim 11, further comprising receiving from a user the number of combination of values for defining the pair-wise or more coverage goal.

16. The method of claim 15, further comprises receiving a plurality of number for defining a plurality of pair-wise or more coverage goals, wherein each pair-wise or more coverage goal is associated with a different set of attributes selected from the functional attributes; and wherein the plurality of pair-wise or more coverage goals jointly define the sub-portion of the coverage test-space.

17. A computer program product comprising:
a computer readable medium;
first program instructions to measure a functional coverage of an at least one executed test using a functional coverage model, wherein the functional coverage model defines at least: functional attributes and associated values, whereby the functional coverage model defines a coverage test-space;
second program instructions to generate an at least one additional test based on a pair-wise or more coverage goal, wherein the pair-wise or more coverage goal defines a number of combinations of values that are to be covered, wherein the number is greater than two, wherein the at least one additional test is generated so as to achieve functional coverage of a sub-portion of the coverage test-space defined by the pair-wise or more coverage goal, wherein at least a portion of the at least one additional test is designed to cover a functional aspect not covered in the functional coverage; and
third program instructions for adapting the functional coverage model to a combinatorial model, wherein said adapting comprises defining a redundant test in the combinatorial model based on covered tests of the test-space according to the functional coverage, wherein a redundant test is a scenario that if tested, does not increase the number of executed tests; and whereby the coverage goal is achieved by generating a test in accordance with the combinatorial model comprising the redundant test, the test covering a first pair-wise or more combination of values covered by the functional coverage and a second pair-wise or more combination of values not covered by the functional coverage, wherein the first pair-wise or more combination of values is associated with the redundant test;
wherein said first, second and third program instructions are stored on said computer readable medium.

18. The computer program product of claim 17 further comprising:
third program instructions to execute a portion of the at least one additional test; and
wherein said third program instructions is stored on said computer readable medium.

19. The computer program product of claim 17, further comprising third program instructions to receive from a user the number of combination of values for defining the pair-wise or more coverage goal; and wherein said third program instructions are stored on said computer readable medium.

* * * * *